United States Patent
Hwu et al.

(10) Patent No.: US 11,926,334 B1
(45) Date of Patent: Mar. 12, 2024

(54) BIDIRECTIONAL MACHINE TEACHING INTERFACE FOR HUMAN-MACHINE CO-PILOTS

(71) Applicant: HRL Laboratories, LLC, Malibu, CA (US)

(72) Inventors: Tiffany Hwu, San Diego, CA (US); David J. Huber, Calabasas, CA (US); Steven W. Skorheim, North Hills, CA (US); Jaehoon Choe, Agoura Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 386 days.

(21) Appl. No.: 17/242,164

(22) Filed: Apr. 27, 2021

Related U.S. Application Data

(60) Provisional application No. 63/047,837, filed on Jul. 2, 2020.

(51) Int. Cl.
*B60W 50/06* (2006.01)
*B60W 50/10* (2012.01)
*B60W 50/14* (2020.01)

(52) U.S. Cl.
CPC ............ *B60W 50/06* (2013.01); *B60W 50/10* (2013.01); *B60W 50/14* (2013.01)

(58) Field of Classification Search
CPC ....... B60W 50/06; B60W 50/10; B60W 50/14
See application file for complete search history.

(56) References Cited

U.S. PATENT DOCUMENTS

| | | | | |
|---|---|---|---|---|
| 8,736,464 B1* | 5/2014 | Downs Mullen | ...... | G01C 23/00 705/305 |
| 2012/0215375 A1* | 8/2012 | Chang | ................... | B60W 50/08 701/1 |
| 2013/0214941 A1* | 8/2013 | Rogers | ................. | G08G 5/0021 340/971 |

OTHER PUBLICATIONS

Bansal, G., Nushi, B., Kamar, E., Weld, D. S., Lasecki, W. S., & Horvitz, E. (Jul. 2019). Updates in human-ai teams: Understanding and addressing the performance/compatibility tradeoff. In Proceedings of the AAAI Conference on Artificial Intelligence, vol. 33, pp. 2429-2437.

(Continued)

*Primary Examiner* — James J Lee
*Assistant Examiner* — Andrew Sang Kim
(74) *Attorney, Agent, or Firm* — TOPE-MCKAY & ASSOCIATES

(57) ABSTRACT

Described is a system for human-machine teaching for vehicle operation. The system determines currently enabled status reporting modes on a vehicle interface of a vehicle. The currently enabled status reporting modes are compared to a set of preferred status reporting modes of previous users. Based on the comparison, a status reporting mode is selected. A current operational status of the vehicle is reported to a current user, via the vehicle interface, using the selected status reporting mode. The system then determines preferred solutions of previous users to address the current operational status of the vehicle. Suggestions to address the current operational status of the vehicle based on the preferred solutions are reported to the user via the vehicle interface. A vehicle action corresponding to a solution selected by the current user is implemented via a vehicle component.

18 Claims, 11 Drawing Sheets

(56) References Cited

OTHER PUBLICATIONS

Baskaya, E., Bronz, M., & Delahaye, D. (Sep. 2017). Fault detection & diagnosis for small uavs via machine learning. In 2017 IEEE/AIAA 36th Digital Avionics Systems Conference (DASC), pp. 1-6.
Hamming, R. W. (1950). Error detecting and error correcting codes. The Bell system technical journal, 29(2), pp. 147-160.
Cover, T., & Hart, P. (1967). Nearest neighbor pattern classification. IEEE transactions on information theory, 13(1), pp. 21-27.
Blei, D. M., Ng, A. Y., & Jordan, M. I. (2003). Latent dirichlet allocation. Journal of machine learning research, 3(Jan), pp. 993-1022.
Wilson, J., Chaudhury, S., & Lall, B. (Aug. 2014). Improving collaborative filtering based recommenders using topic modelling. In 2014 IEEE/WIC/ACM International Joint Conferences on Web Intelligence (WI) and Intelligent Agent Technologies (IAT), vol. 1, pp. 340-346.
Ganegedara, T. (Aug. 2018). Intuitive guide to latent dirichlet allocation. Towards data science, pp. 1-19.

\* cited by examiner

| Expertise | S1 | S2 | S3 | S4 | S5 | S6 | S7 | M1 | M2 | M3 | M4 |
|---|---|---|---|---|---|---|---|---|---|---|---|
| Pilot 1 | 1 | 1 | 1 | 0 | 0 | 0 | 0 | 1 | 1 | 0 | 0 |
| Pilot 2 | 0 | 0 | 0 | 0 | 1 | 1 | 1 | 0 | 0 | 1 | 1 |

FIG. 8

$Acc_{mode}$

| | M = 0 | M = .1 | M = .2 |
|---|---|---|---|
| N = 1 | 1.00 (mean) ± 0.00 (std) | 0.52 ± 0.01 | 0.52 ± 0.01 |
| N = 3 | 0.95 ± 0.08 | 0.51 ± 0.01 | 0.51 ± 0.01 |
| N = 5 | 1.00 ± 0.00 | 0.52 ± 0.01 | 0.52 ± 0.01 |

FIG. 11A $Acc_{solution}$

| | M = 0 | M = .1 | M = .2 |
|---|---|---|---|
| N = 1 | 1.00 ± 0.00 | 0.90 ± 0.11 | 0.98 ± 0.02 |
| N = 3 | 0.97 ± 0.04 | 0.63 ± 0.18 | 0.78 ± 0.10 |
| N = 5 | 1.00 ± 0.00 | 0.68 ± 0.08 | 0.51 ± 0.09 |

FIG. 11B

BIDIRECTIONAL MACHINE TEACHING INTERFACE FOR HUMAN-MACHINE CO-PILOTS

CROSS-REFERENCE TO RELATED APPLICATIONS

This is a Non-Provisional Application of U.S. Provisional Application No. 63/047,837, filed in the United States on Jul. 2, 2020, entitled, "A Bidirectional Machine Teaching Interface for Human-Machine Co-Pilots," the entirety of which is incorporated herein by reference.

BACKGROUND OF INVENTION

(1) Field of Invention

The present invention relates to a system for human-machine teaching and, more particularly, to a system for human-machine teaching using a bidirectional communication interface.

(2) Description of Related Art

Artificially intelligent (AI) systems are able to process vast amounts of information and arrive at conclusions quickly. However, artificial systems will occasionally make decisions that clearly defy common sense or are otherwise incomprehensible to a human being. The normal method of addressing this is to have a human available to override AI decisions. This, however, does not provide much opportunity for the artificial system to learn from the human operator's experience, nor does it provide ideal opportunities for the human operator to learn from the machine (see Literature Reference No. 1 of the List of Incorporated Literature References).

The use of checklists and flowcharts is common in aviation, providing solutions to human pilots for common contingencies. They are presented uniformly, without adapting to skill levels and preferences or learning from feedback. Novice pilots may not understand the information quickly and expert pilots may have better solutions than those presented. Several approaches in autopilot technology have used approaches from machine learning and artificial intelligence (see Literature Reference No. 2). However, the processes behind them are opaque to human users, making it difficult to harness the strengths of humans and machines. Furthermore, it is often difficult to transform these processes, flowcharts, and checklists into datasets that can be used to train an AI algorithm.

In the piloting of aircraft, artificial intelligence has the potential to enhance pilot capabilities, from aiding the pilot with useful information to serving as a full partner in planning and control. In order for these human-machine interactions to occur, it is necessary to have a framework for bidirectional teaching of information. For instance, when a contingency occurs during flight and the human pilot is not experienced with the situation, the human can learn by receiving information and suggestions from the machine. On the other end, the machine can learn to improve its suggestions from expert pilots, and learn to adapt to the individual needs of human users.

Thus, a continuing need exists for a system that combines the strengths of humans and machines to facilitate learning between the two.

SUMMARY OF INVENTION

The present invention relates to a system for human-machine teaching and, more particularly, to a system for human-machine teaching using a bidirectional communication interface. The system comprises one or more processors and a memory having instructions such that when the instructions are executed, the one or more processors perform multiple operations. The system determines one or more currently enabled status reporting modes on a vehicle interface of a vehicle. The one or more currently enabled status reporting modes are compared to a set of preferred status reporting modes of previous users. Based on the comparison, a status reporting mode is selected. A current operational status of the vehicle is reported to a current user, via the vehicle interface, using the selected status reporting mode. A set of preferred solutions of previous users to address the current operational status of the vehicle is determined. One or more suggestions to address the current operational status of the vehicle based on the set of preferred solutions is reported to the current user via the vehicle interface. A vehicle action is implemented via a vehicle component, wherein the vehicle action corresponds to a solution selected by the current user based on the one or more suggestions.

In another aspect, wherein comparing the one or more currently enabled reporting modes to a set of preferred status reporting modes of previous users comprises applying a similarity metric to identify a set of previous users that are most similar to the current user; determining an averaged preference value for each of the preferred status reporting modes of the set of previous users, wherein reporting, to the current user, the current operational status of vehicle comprises activating a status reporting mode in the vehicle having an averaged preference value above a predetermined threshold; and using the activated status reporting mode, reporting the current operational status of the vehicle via the vehicle interface.

In another aspect, the similarity metric is a k nearest neighbor (KNN) technique.

In another aspect, the similarity metric is Latent Dirichlet Allocation (LDA).

In another aspect, wherein determining the set of preferred solutions of previous users comprises generating a set of expert-weighted solutions by applying a similarity metric to a plurality of expert-weighted solutions; averaging the set of expert-weighted solutions; and ranking the set of expert-weighted solutions, and wherein reporting the one or more suggestions to the current user comprises presenting the ranked set of expert-weighted solutions to the current user via the vehicle interface.

In another aspect, the system updates the one or more currently enabled status reporting modes based on manual feedback, via the vehicle interface, from the current user, and updates the one or more suggestions based on the updated one or more currently enabled status reporting modes.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8 is a table illustrating mode and solution values for two pilots according to some embodiments of the present disclosure;

FIG. 11A is a table illustrating mode accuracies according to some embodiments of the present disclosure; and FIG. 11B is a table illustrating solution accuracies according to some embodiments of the present disclosure.

DETAILED DESCRIPTION

Figure 1:
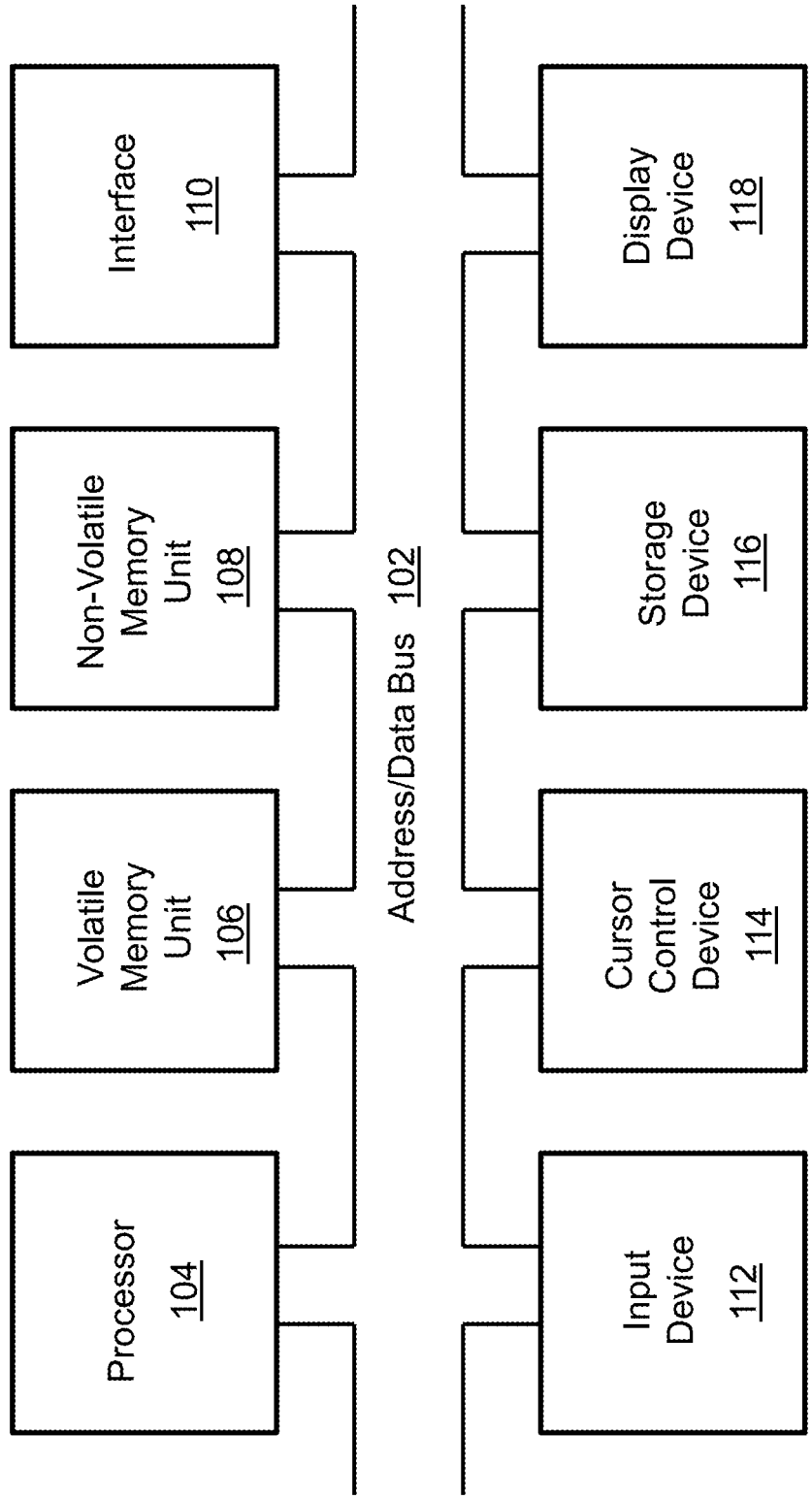
FIG. 1 is a block diagram depicting the components of a system for human-machine teaching according to some embodiments of the present disclosure.

The present invention relates to a system for human-machine teaching and, more particularly, to a system for human-machine teaching using a bidirectional communication interface. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

1. Bansal, G., Nushi, B., Kamar, E., Weld, D. S., Lasecki, W. S., & Horvitz, E. (2019, July). Updates in human-ai teams: Understanding and addressing the performance/compatibility tradeoff. In Proceedings of the AAAI Conference on Artificial Intelligence, Vol. 33, pp. 2429-2437.
2. Baskaya, E., Bronz, M., & Delahaye, D. (2017, September). Fault detection & diagnosis for small uavs via machine learning. In 2017 IEEE/AIAA 36th Digital Avionics Systems Conference (DASC), pp. 1-6.
3. Hamming, R. W (1950). Error detecting and error correcting codes. The Bell system technical journal, 29(2), pp. 147-160.
4. Cover, T., & Hart, P. (1967), Nearest neighbor pattern classification. IEEE transactions on information theory, 13(1), pp. 21-27.
5. Blei, D. M., Ng, A. Y., & Jordan, M. I. (2003). Latent dirichlet allocation. Journal of machine learning research, 3 (January), pp. 993-1022.
6. Wilson, J., Chaudhury, S., & Lall, B. (2014, August). Improving collaborative filtering based recommenders using topic modelling. In 2014 IEEE/WIC/ACM International Joint Conferences on Web Intelligence (WI) and Intelligent Agent Technologies (IAT), Vol. 1, pp. 340-346.
7. Ganegedara, T. (2018, August). Intuitive guide to latent dirichlet allocation. Towards data science.

(2) PRINCIPAL ASPECTS

Various embodiments of the invention include three "principal" aspects. The first is a system for human-machine teaching. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
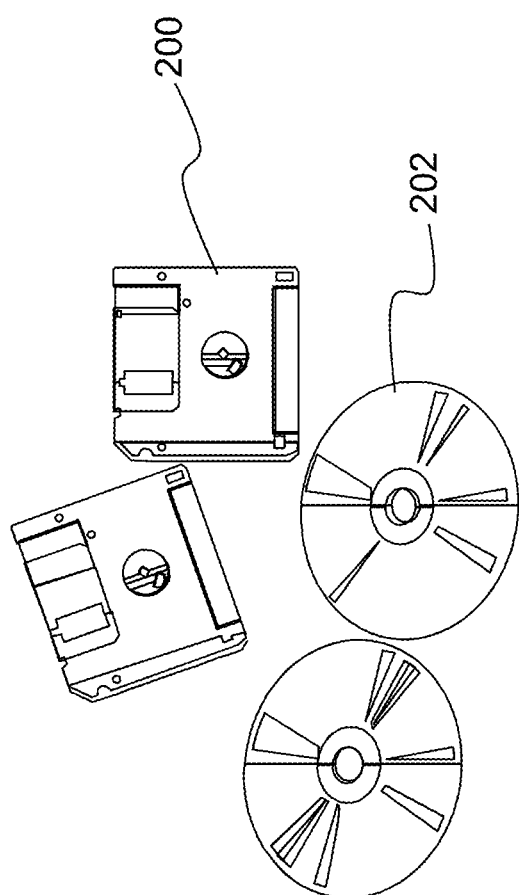
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS OF THE INVENTION

Described is a system that reports contingencies and suggests solutions to machine operators by learning observations of operator behaviors. Although not limited thereto, for illustrative purposes, the presentation of information is tailored towards the style and experience levels of individual pilots, creating a unique bidirectional communication framework for human-machine teaching. The present invention is capable of simultaneously teaching and learning by observation to present information in the most concise and intuitive way. This allows for the efficient combination of the rapid information analysis provided by artificial intelligence with the common sense and intuition of the pilot or machine operator.

One purpose of the invention described herein is to promote communication and teamwork between humans and machines. Artificially intelligent (AI) systems are able to process vast amounts of information and arrive at conclusions quickly. However, artificial systems will occasionally make decisions that clearly defy common sense or are otherwise incomprehensible to a human being. The normal method of addressing this is to have a human available to override AI decisions. This, however, does not provide much opportunity for the artificial system to learn from the human operator's experience, nor does it provide ideal opportunities for the human operator to learn from the machine (see Literature Reference No. 1). Consequently, if the AI is truly making a mistake, it will perpetually continue to do so. If continuous AI errors or disagreements with the human operator persist, the system may be mistrusted or disabled entirely, nullifying any assistance it might have otherwise supplied. Just as people learn more effectively when they actively perform a skill than when passively observing another agent, artificial systems also learn more effectively from direct feedback about their own actions than they do from fixed data sets.

The system according to embodiments of the present disclosure provides superior learning opportunities for human pilots by accounting for individual differences in skill level, learning appropriate solutions from a systems database of expert users, and suggesting context-relevant solutions to novice users. The system also provides a superior learning environment for the AI as it allows the pilot to supervise the AI's behavior by either following or disregarding suggestions. Thus, the pilot does not have to spend a great deal of time actively trying to change settings or correct the AI. Bidirectional communication between the human and AI/algorithm encourages trust in the system by allowing the operator to understand the nuances of the AI system and the "thought" processes involved in arriving at a decision. Conversely, an AI system that learns from a broad range of human interactions can learn to emulate those actions and provide an explainable approach to problem solving (e.g., "I selected this course of action because of X input from Y user."). This level of explainability and robustness will result in a system that is more trusted than another that is simply trained on an isolated labeled training set.

(3.1) Overview

In the piloting of aircraft, artificial intelligence has the potential to enhance pilot capabilities, from aiding the pilot with useful information to serving as a full partner in planning and control. In order for these human-machine interactions to occur, it is necessary to have a framework for bidirectional teaching of information. For instance, when a contingency occurs during flight and the human pilot is not experienced with the situation, the human can learn by receiving information and suggestions from the machine. On the other end, the machine can learn to improve its suggestions from expert pilots, and learn to adapt to the individual needs of human users.

An interface according to embodiments of the present disclosure incorporates principles of cognitive science with techniques of artificial intelligence to facilitate learning between the two. The system relies upon formatting the presentation of information to allow the human operator to effectively train the AI agent with little to no overt effort on the operator's part. While adaptable interfaces are often desired, they are difficult to implement. The present invention satisfies a long-felt need for humans and machines to combine their strengths. The interface uses pattern matching (e.g., nearest neighbor pattern classification) to learn about the preferences and strategies of pilots in a useful and non-obvious manner. The interface then provides flight guidance and queries, along with AI state information to human operators while maintaining interpretability.

The present invention reports information to human pilots via solutions and modes. Modes indicate a collection of modalities that can be used to convey flight status as detected by the machine. For instance, if the plane encounters icy conditions, this information can be conveyed to the pilot by playing sounds, displaying text, or visual highlights. Solutions indicate suggestions that the pilot can take to address the current flight status. For instance, in an icy condition, some solutions may include turning on anti-icing features and adjusting altitude. The invention learns to use modes and solutions that are effectively utilized by the current user by comparing their behavior to the data of past users.

Figure 3:
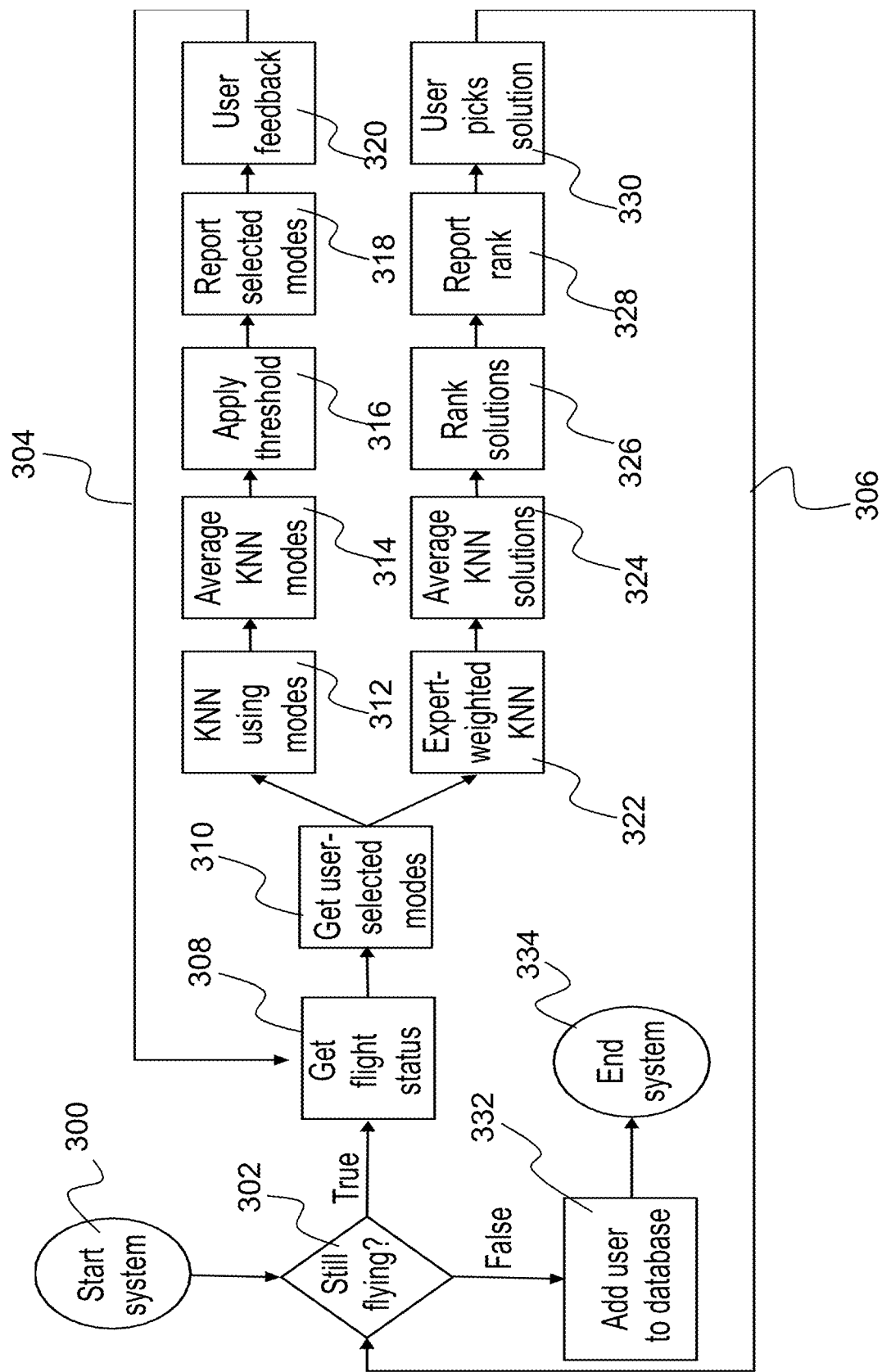
FIG. 3 is a flowchart illustrating a system for human-machine teaching according to some embodiments of the present disclosure.

FIG. 3 shows an overview of the system described herein, which runs in conjunction with a database of past pilot behavior and a graphical user interface to communicate with the current pilot. The system begins at the start of a flight or flight simulation (i.e., start system (element 300)) and determines whether the plane is still flying (element 302). Two loops (elements 304 and 306), one for modes (element 304) and one for solutions (element 306), run in parallel. Both loops (elements 304 and 306) begin with the detection of flight status (element 308) via external modules within the plane. The external module can include the annunciator panel in the cockpit with warning lights for failure of engines, wings, and batteries. In addition, incoming communications from airport traffic control towers can provide flight status information. Next, the system checks the interface to see which modes the current pilot has enabled on the interface (i.e., get user-selected modes (element 310)). Then, the set of user-selected modes (element 310) is used to compare to the preferred modes of pilots in the dataset. The comparison is performed by applying a similarity metric between the current pilot and pilots in the database and identifying a small group of pilots (i.e., KNN using modes (element 312)) in the dataset that are most similar to the current pilot. The technique used for identifying this group is called k nearest neighbors (KNN), which will be described in detail below.

The loop (element 304) used for processing modes then averages the preferred modes over the group of similar pilots (i.e., average KNN models (element 314)). Modes that achieve an averaged preference value above a given applied threshold (element 316) are enabled/selected, and the report of selected modes (element 318) is used to report the flight status (element 308) to the user. The user can then provide user feedback (element 320) by manually enabling or disabling modes, resulting in a refreshed set of user-selected modes (element 310). The refreshed set of user-selected modes (element 310) is then used to update the suggestions continuously through the loop (element 304). Over time, the system settles to a desired set of the modes for the current user, consisting of modes explicitly selected by the user and modes recommended to the user.

For suggesting solutions, the loop (element 306) similarly applies the KNN technique, but weights the similarity judgements with expertise level (i.e., expert-weighted KNN (element 322)) a scalar value that is assigned to each pilot externally by metrics such as years of experience and previous evaluation results. As in the loop (element 304), the solutions are all compared to the user-selected modes (element 310). For both loops (element 304 and 306), a similarity value is calculated between the current user and each user in the database. The loop (element 306) increases or decreases this similarity value according to the level of expertise of the user in the database. Thus, a user in the database that is both an expert and similar to the current user will have the highest similarity value. The effect of this is that the solutions offered to the pilot are a mixture of the solutions used by the most similar and most experienced pilots (i.e., average KNN solutions (element 324)). Rather than thresholding the solutions as in the loop (element 304) for processing modes, the solutions are sorted in order of highest to lowest (i.e., rank solutions (element 326)). The solutions are then presented to the user with this ranking order (i.e., report rank (element 328)), allowing the user to make the final selection that can optionally disregard the top suggested solutions (i.e., user picks solution (element 330)).

At the end of the flight (or mission, etc.), the user's solution choice and preferred modes are added to the database (i.e., add user to database (element 332), and the system ends (element 334). The set of ranked solutions (element 326) is also adjusted on the basis of decisions made during flight and can be thought of as a living document that may reorder the priorities of potential solutions based on exigent circumstances in the flight scenario. As a result, the solution set is adapted to continuously provide the highest likelihood solutions for the current flight status/user behavior data.

(3.2) User Database

Figure 4:
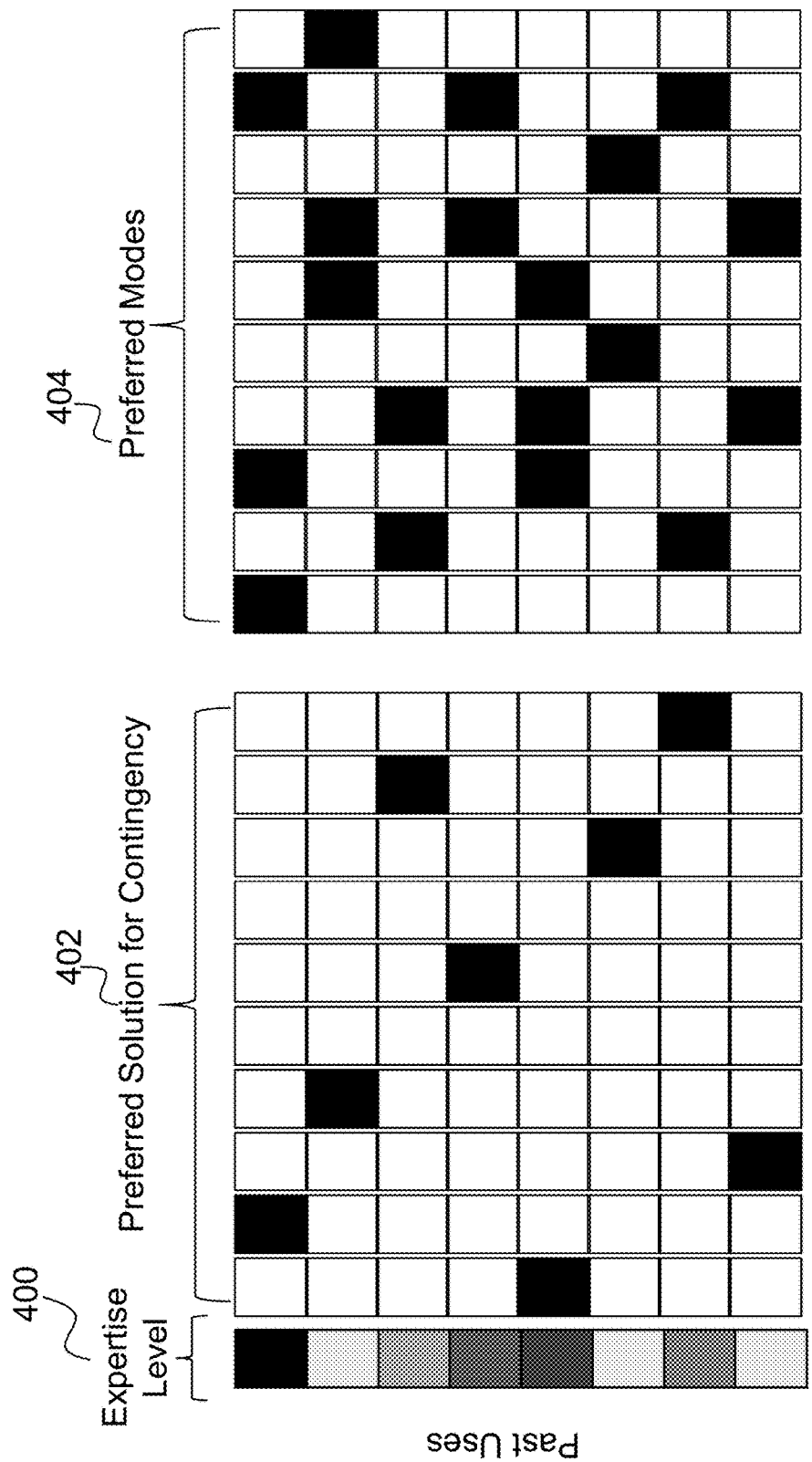
FIG. 4 is an illustration of a database of past users according to some embodiments of the present disclosure.

FIG. 4 illustrates a database of past users, specifically previous pilots. The database of previous pilots contains three components for each user: expertise level (element 400), preferred solution for contingency (element 402), and preferred modes (element 404). The expertise level (element 400) is a scalar value ranging from 0 to 1, which is set for each pilot using an external measure, such as the number of years of flight experience or performance evaluation scores. In this initial implementation, a holistic, general form of expertise that can be considered a relative measurement against ground-truth expert information is considered. However, there are many aspects of flight that may be categorized into more discrete skillsets, which can offer a more granular view of human pilot users that would make preferred solutions and modes adhere more accurately to the pilot's true preferences and skill level.

The preferred solution (element 402) for an abnormal flight status or contingency is expressed as a vector that contains one element per discrete action possible. This may be a binary vector if only one action is chosen, but may optionally be continuous values if options are allowed to be chosen more than once, or multiple options are selected simultaneously. The preferred modes (element 404) of the user are also vectors, with one element per possible mode. This is a binary vector, but may optionally be converted to continuous values if a large number of mode selection changes are expected to occur within a flight. In the database depicted in FIG. 4, each row represents the data of a past user. In this non-limiting example, the darkness of each rectangle is relative to the value of each entry. For the expertise column, darker values are closer to value 1 and lighter values are closer to value 0. For the columns that represent preferred solutions (element 402), unfilled rectangles indicate 0 and filled rectangles indicate 1. The same applies to the columns representing the preferred modes (element 404).

Any similarity comparison that computes a distance measurement of two vectors may be used with the invention. The similarity function are represented as S(U, U'), where U is the user's vector of preferred modes and U' is a vector of preferred modes for a pilot in the dataset. Only the vectors for modes are used for the similarity judgments, not the vectors for solutions. A simple similarity vector for binary implementations is the Hamming distance (see Literature Reference No. 3), which is the number of positions in the vectors in which the elements are not equal. By applying the similarity measurement in a pairwise fashion between the current user and each of the pilots in the dataset a set of size k most similar pilots is found, in a technique known as k nearest neighbors (see Literature Reference No. 4).

Figure 5:
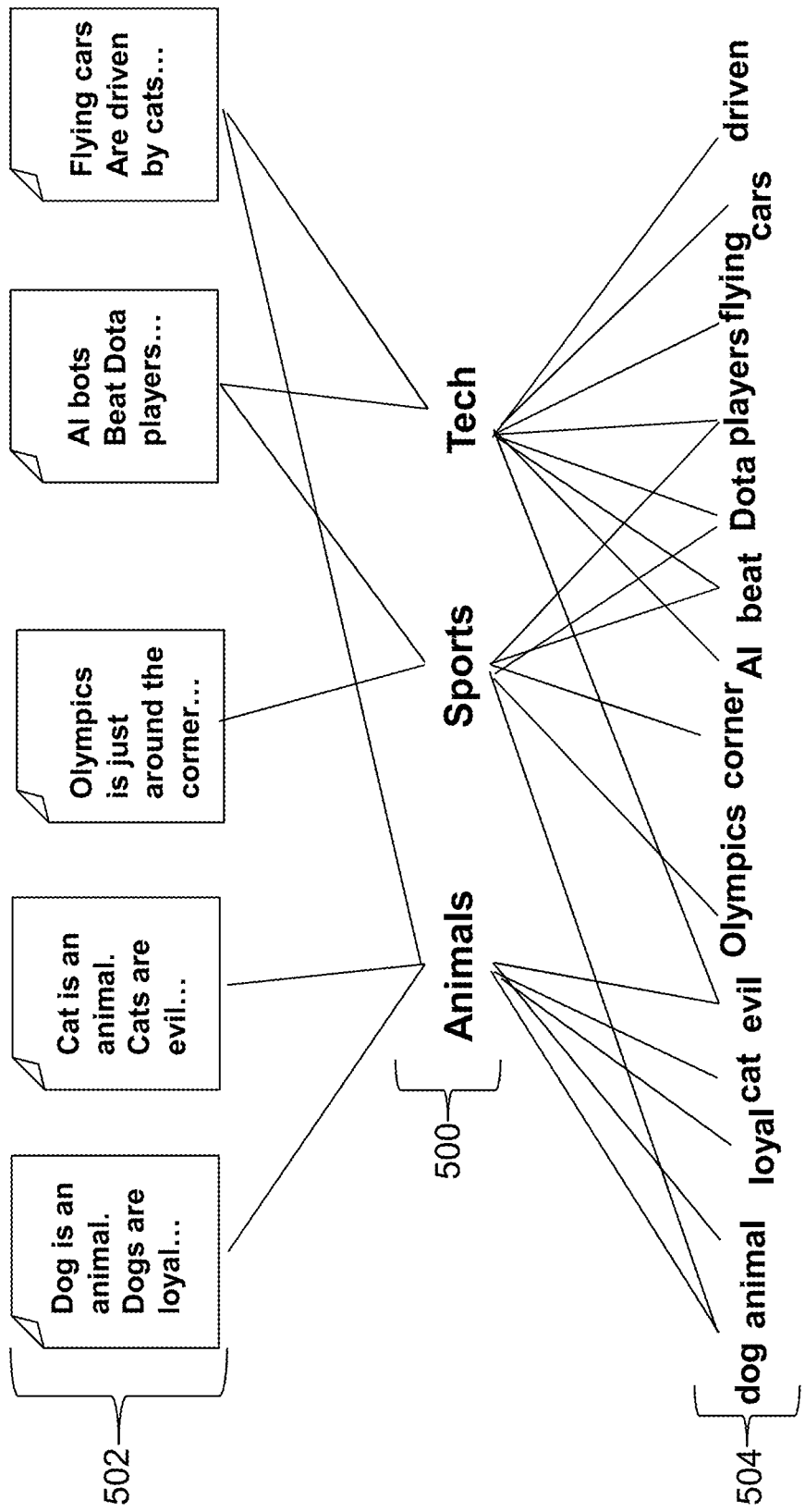
FIG. 5 is an illustration of intuition behind latent Dirichlet allocation (LDA) topic modeling according to prior art.

A more advanced similarity measurement making use of Latent Dirichlet Allocation (LDA) (see Literature Reference No. 5) can also be applied for enhanced transparency and explainability to users and observers of the system. In traditional LDA, a collection of documents is used to learn a set number of topics in an unsupervised manner. FIG. 5 illustrates the intuition behind LDA topic modeling, taken from Literature Reference No. 7. A collection of topics (element 500) can be trained from a collection of documents (element 502), such that each topic (element 500) is associated with a collection of documents (element 502) and the words (element 504) belonging to them. As shown in FIG. 5, the documents (element 502) in a dataset are assumed to contain a distribution of multiple topics (element 500), which in turn consist of distributions of words (element 504).

Each document (element 502) is treated as a bag-of-words, such that the order of words (element 504) is irrelevant and the document (element 502) is represented only as a collection of word counts. To generate a document (element 502), a collection of words (element 504) is generated by sampling a topic (element 500), then sampling a word from the word distribution of that topic. The parameters of the probability distributions for these sampling processes are learned by finding the set of parameters that maximize the probability of the dataset being generated by such parameters.

Figure 6:
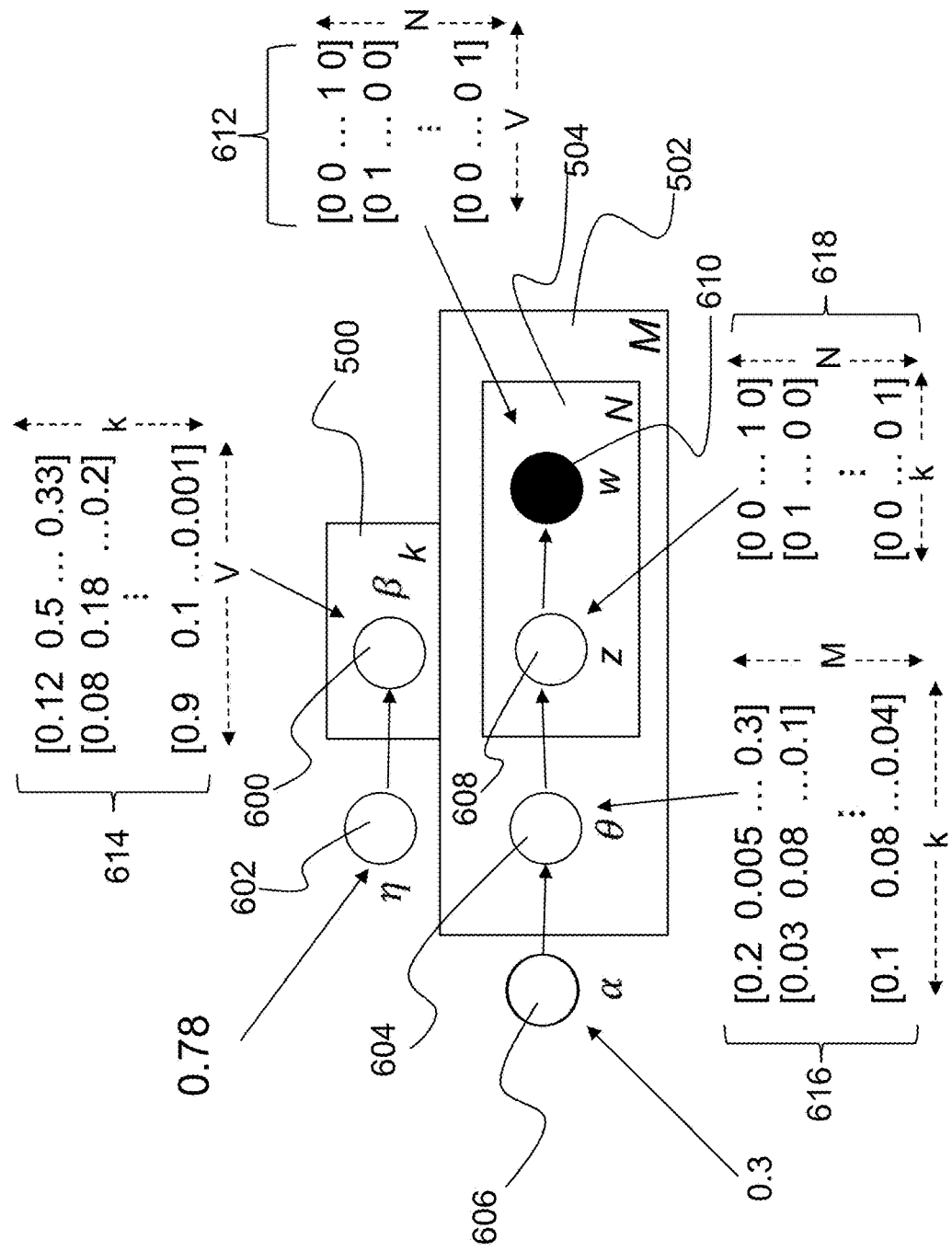
FIG. 6 is an illustration of an overview of LDA according to prior art.

A graphical model representation of the process of generating a document within the dataset taken from Literature Reference No. 7 is shown in FIG. 6. For k topics (element 500), a value for $\beta$ (element 600) is generated from a Dirichlet distribution of hyperparameter $\eta$ (element 602). For each of M documents (element 502), a value for $\theta$ (element 604) is generated from a Dirichlet distribution with hyperparameter $\alpha$ (element 606). For each of N words (element 504), a value z (element 608) representing the topic is sampled using a Multinomial distribution with parameter $\theta$ (element 604). For each topic z (element 608), a word w (element 610) is sampled from probability distribution p $(w_n|z_n, \beta)$. This sample is taken by finding the word distribution of topic z (element 608) and sampling a word from the word distribution of the corresponding topic. The model is only given observable values for w (element 610), which are the word counts for each of M documents (element 502) with vocabulary size V. This is indicated with the matrix (element 612) of size N×V. The remaining matrices (elements 614, 618 and 618) are the results from sampling. Training the LDA consists of finding the most likely values within these remaining matrices (elements 614, 618 and 618) that generated the observable words.

By representing the mode preferences of a single pilot as the "words" within a single document, a powerful tool for learning pilot types as "topics" is gained. For instance, pilots preferring auditory modes will become associated with an auditory topic, and pilots preferring visual modes will become associated with a visual topic. Each topic is defined by this clustering of pilots, as well as the modes used by the pilots. The user of the system or an external observer can then gain additional insight into why specific modes were recommended, as the modes are now associated with topics.

As described in Literature Reference No. 6, similarity measurements for recommendations can be enhanced using LDA-trained topics. For each user U, a vector $U_f$ can be formed, consisting of a probability distribution over the k trained topics. As described in Literature Reference No. 6, a similarity score between two users using LDA outputs can be calculated as follows:

$$S_{topic}(U, U') = e^{-D_{KLSymmetric}(U_f, U'_f)}$$

$$D_{KLSymmetric}(U_f, U'_f) = D_{KL}(U_f \| U'_f) + D_{KL}(U'_f \| U_f)$$

$$D_{KL}(U_f \| U'_f) = \sum_i \ln\left(\frac{U_{f(i)}}{U'_{f(i)}}\right) U_{f(i)}.$$

Any base similarity measure $S_{base}$ used for recommending modes and solutions can be augmented by topic similarities, resulting in final measures of:

$$S_{modes}(U,U')=S_{topic}(U,U')*S_{base}(U,U'),$$

$$S_{solutions}(U,U')=E(U')*S_{topic}(U,U')*S_{base}(U,U'),$$

where E(U') is the assigned expertise of user U' in the database.

(3.3) User Interface Design

Figure 7:
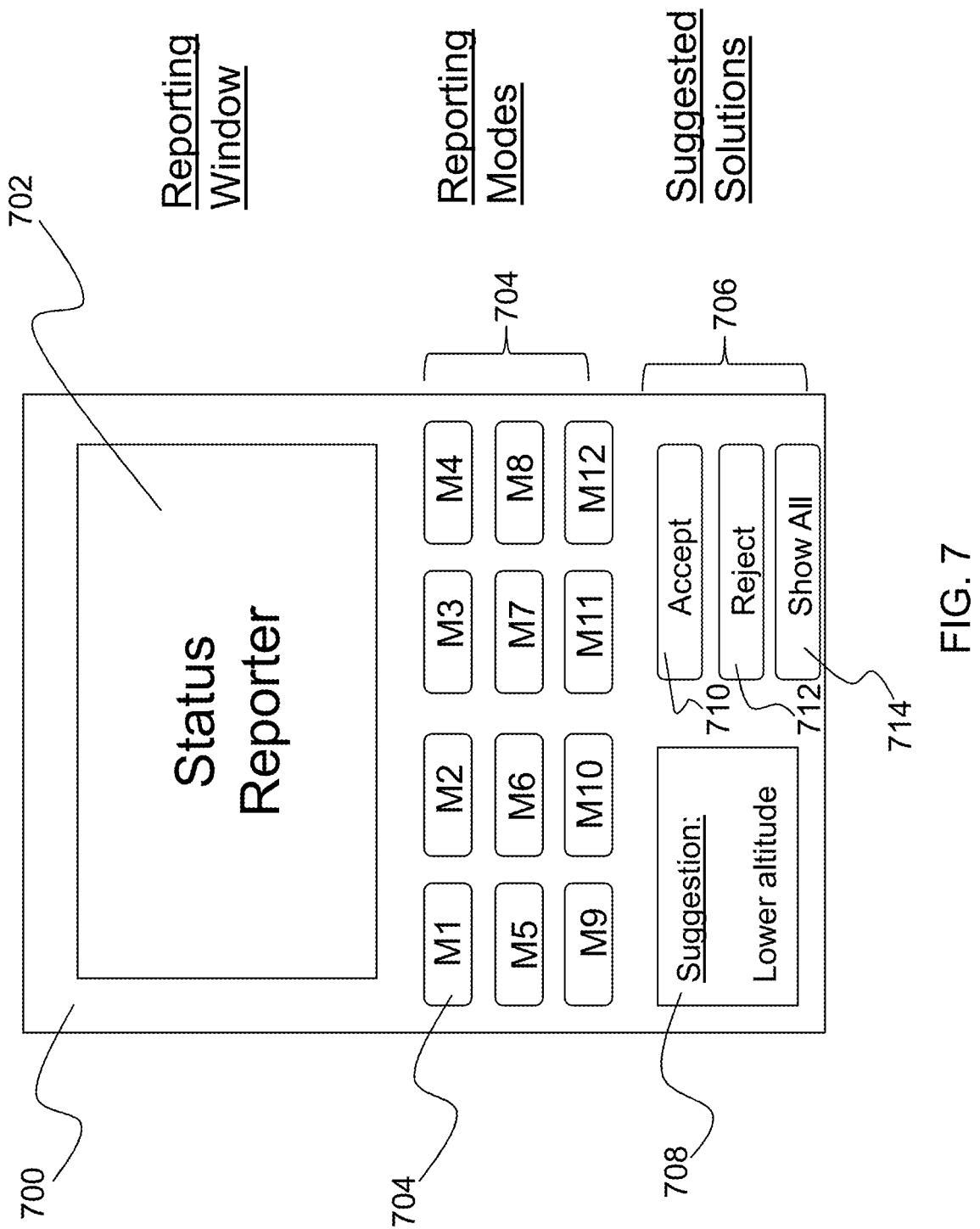
FIG. 7 is an illustration of a graphical user interface (GUI) design for reporting modes, suggesting solutions, and receiving feedback from the user according to some embodiments of the present disclosure.

The graphical user interface (element 700) is used in the cockpit along with the original plane controls, as depicted in FIG. 7. The user interface (element 700) can be implemented as an additional piece of hardware within a physical cockpit, or as part of an on-screen panel within a plane simulation. The interface (element 700) contains three main components: the status reporting window (element 702), buttons for reporting modes (element 704), and buttons for implementing solutions (element 706). The status reporting window (element 702) is used as an optional means for providing insight into the flight status detection of the system. For instance, if a machine learning algorithm is applied to detect different types of contingencies, the algorithm details and parameters will be displayed within this window (element 702). This is designed for maximum transparency and insight between the machine and human. Any implementation of a classification algorithm, including a deep neural network, logistic regression, or maximum likelihood estimation, can be applied to detect different types of contingencies, such as engine flameout, engine fire, wing failure, icing, bird strike, and turbulence.

The buttons for reporting modes (element 704) are displayed in static positions, with the names of modes written on each button. Each mode (e.g., element 704) can be toggled on and off by pressing the corresponding button, with a color indication to note the current state. Modes can be toggled through the suggestion system (element 708). However, modes that are manually toggled by the user are locked to avoid oscillation and respect the user's preference. Solutions are presented to the user one at a time to avoid decision paralysis and enhance attention. They are presented in the order output by the recommendation system, with buttons that allow the user to perform the action (e.g., accept (element 710)) or see the next suggestion (e.g., reject (element 712)), thereby receiving feedback from the user. There is also a button that displays all options (i.e., show all (element 714)) to the user, for more experienced pilots to quickly override the system if necessary. If the solution can be immediately executed by the machine, it is done when the UI button is pressed. If the solution requires action from the pilot, instructions are displayed through the status reporter and through the selected modes.

(3.4) Testing Setup

The invention was tested using the X-Plane simulator with a separate GUI window and recommendation process. X-Plane is a flight simulation engine series developed and published by Laminar Research located in Columbia, South Carolina. The situation of focus was flying within icy conditions, a dangerous contingency type with many possible action options. Four modes of status reporting called "Text", "Description", "Speech", and "Sound" were created. The "Text" mode overlays text on the simulator screen, the "Description" mode displays a longer description within the GUI window, "Speech" provides a spoken cue, and "Sound" plays a short audio sound effect. Seven possible solutions were implemented, each of which controlled a de-icing switch to remove ice from a different part of the plane. Additional non-limiting examples of solutions that can be implemented include setting the altitude, heading, and airspeed of autopilot to some set of values; communicating with passengers via seatbelt signs and oxygen masks; and employing emergency landing features, such as landing gear and speed brakes. As a simple demonstration, a dataset of two pilots was prepopulated with the values in the table in FIG. 8. As shown, Pilot 1 is an expert who prefers solutions 1-3 and modes 1-2, which happen to be the visual cues. Pilot 2 is a novice who prefers solutions 5-7 and modes 3-4, which happen to be the audio cues. After training LDA on this dataset on five topics, two topics were clearly captured, with one topic covering Pilot 1 and visual modes, and one topic covering Pilot 2 and audio modes.

Figure 9:
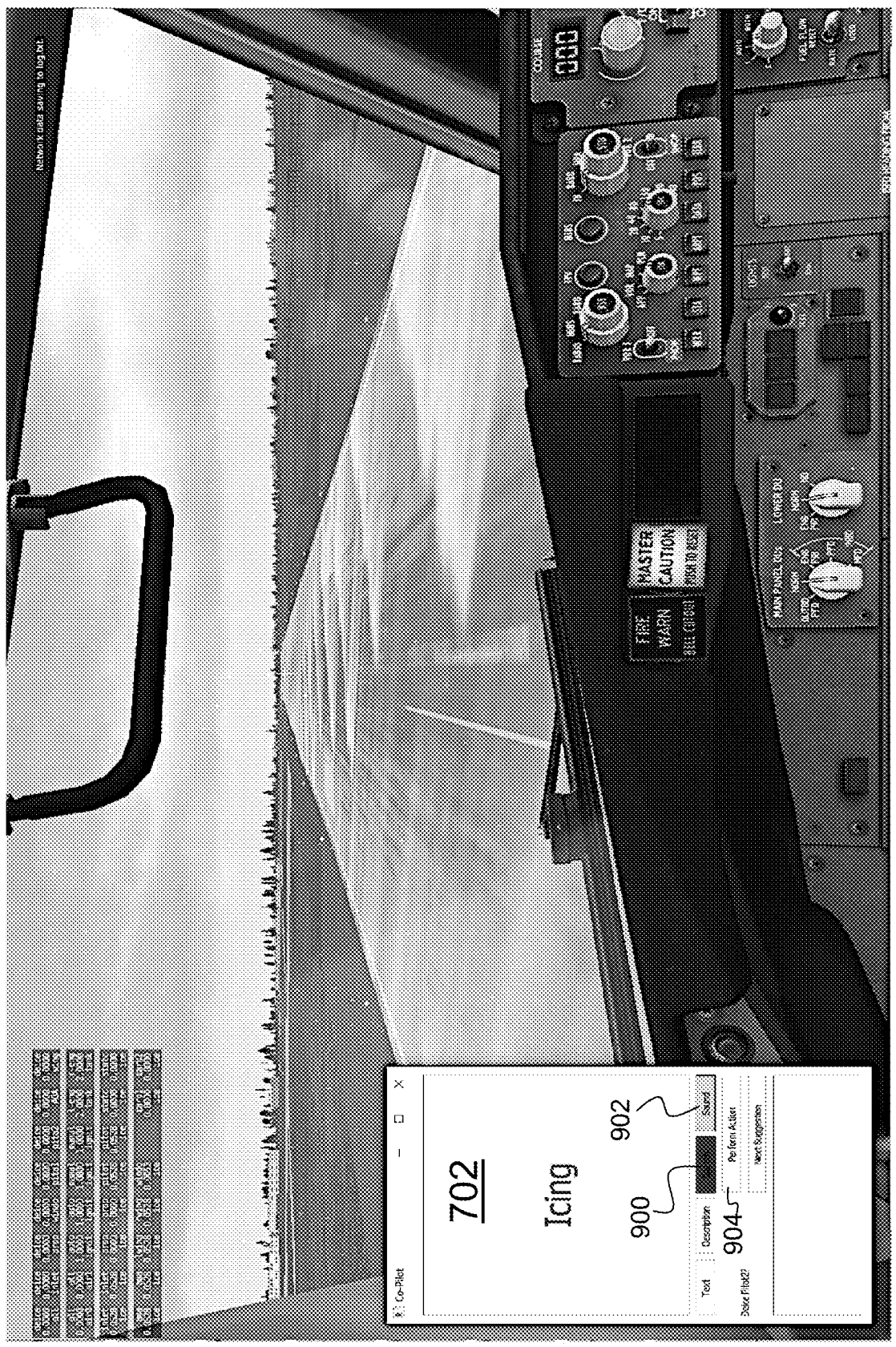
FIG. 9 is an illustration of a screenshot of XPlane simulator with custom GUI according to some embodiments of the present disclosure.

With the graphical user interface (GUI) and database, the invention described herein was run online with human pilots controlling the simulation. The simulation started with the plane on a snowy runway, with ice slowly accumulating on the plane. The GUI communicated with X-Plane using the built-in UDP (user datagram protocol) interface. FIG. 9 depicts a screenshot of a X-Plane simulator with custom GUI. Whenever icing levels of the plane reached a certain threshold, the GUI displayed the "Icing" status in its status reporter window (element 702). In FIG. 9, the user pressed the "Speech" button (element 900) to enable (or activate) that modality, which darkens, lightens, (or changes the color of) the button on the display. The GUI then used this input to generate further mode recommendations, which returned "Speech" and "Sound". The "Sound" modality was then enabled, with the "Sound" button (element 902) darkening slightly (or changing a different color) to indicate that it was a recommended mode. The user was mapped to the auditory topic and judged to be most similar to Pilot 2. When displaying solutions, solution 1 was the first suggestion. Although the user was most similar to Pilot 2, the expertise of Pilot 1 weighed more heavily, causing the preferred solution of Pilot 1 to appear first.

Figure 10:
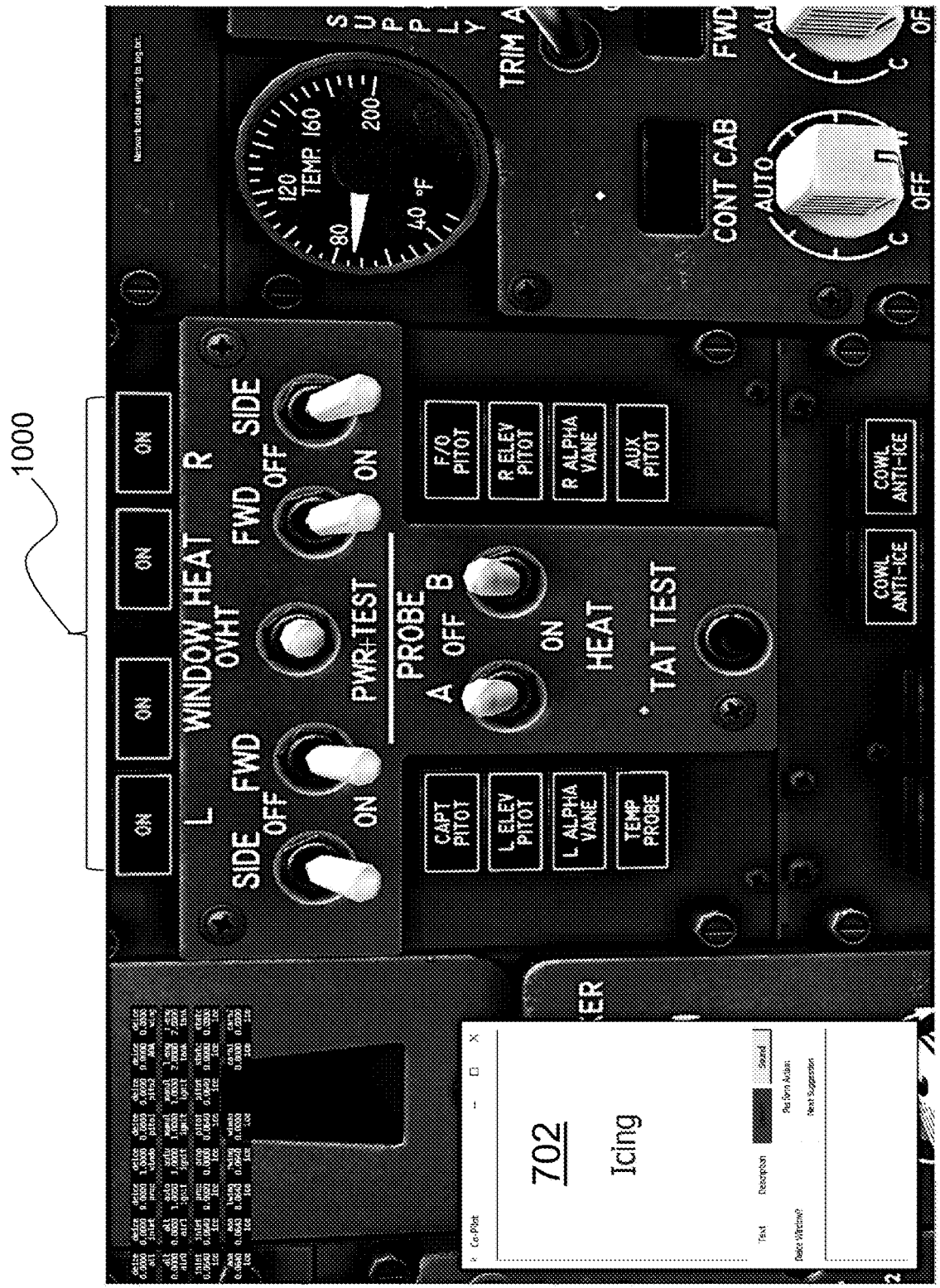
FIG. 10 is an illustration of a screenshot of XPlane simulator with a view of anti-icing controls in the cockpit overhead panel according to some embodiments of the present disclosure.

When the user clicks the "Perform Action" button (element 904) for the suggested solution of de-icing the windows, the GUI sends the command through the X-Plane UDP interface. The command causes the corresponding switch to turn on as indicated by the "on" displays (element 1000) in the cockpit as shown in FIG. 10, which depicts a screenshot of a X-Plane simulator with a view of anti-icing controls in the cockpit overhead panel.

Through a simplified test case, the invention described herein was able to learn topic distributions over pilots in a database, recommend modes of presentation by comparing the user with the pilots in the database, and present solutions based on the expertise and similarity of pilots in the database. The ability of the present invention to make appropriate mode and solution suggestions given a large database of generated data was also tested. To generate the database, 100 possible modes and 100 possible solutions were created. It was assumed the users were clustered latently into N types of users. Each type was associated with an exemplary mode vector and an exemplary solution choice, both randomly generated. Each of 1000 users in the database were assigned a type. To generate the expertise of a user, a random value in the range 0 to 1 was uniformly sampled. To generate the modes of a user, the exemplary mode for the user's assigned type was retrieved, then mutated such that M proportion of the values were flipped from 0 to 1 or 1 to 0. To generate the solution, the exemplary solution for the user's assigned type was retrieved. At a probability of (1-expertise), the user's solution was switched to a random one, to model the fact that less expert pilots are more likely to choose solutions that are different from the ideal.

The dataset was divided such that 80% of users formed a training set and 20% formed a testing set. For each user in the testing set, 20% of their selected mode values were held out, and a set of recommended modes and a ranking of solutions were generated. A mode accuracy $Acc_{mode}$ was calculated as the proportion of mode values in which the recommended value matched the user's actual value. A solution accuracy $Acc_{solution}$ was calculated according to the rank of the correct solution for the user's type, using the following equation:

$$Acc_{solution} = \frac{1 - \text{rank(correct solution)}}{N_{solutions}}$$

The values of N and M were then varied, three databases for each condition were generated, and the accuracies were calculated as shown in the tables in FIGS. 11A ($Acc_{mode}$) and 11B ($Acc_{solution}$). The results show that the invention described herein is scalable across a large dataset of varied pilots, with better accuracy when the number of types is small and the pilot's preferred modes do not deviate much from the ideal modes for their types.

The present invention is a machine that communicates information to a human that is piloting a plane or simulator. It can be physically implemented within a flight system as an improvement upon the functioning of the control interface. The invention interfaces with the instrumentation and controls of the vehicle in which it is installed and requires them for system input, and is therefore a complete system instead of simply a set of algorithms. The system according to embodiments of the present disclosure can be integrated into planes and/or flight simulators to interact with human pilots in real time. When implemented on physical hardware, the system can be part of a physical machine involved in controlling an aircraft. Non-limiting examples of physical machines that control aircraft are autopilot, which controls the trajectory of an aircraft, and autothrottle, which controls the power delivered by the engines.

In one aspect, the present invention applies to the operation of planes and pilot training. The invention described herein can improve safety by efficiently providing pilots with the information they need to handle complicated situations and by improving the adaptability of AI autopilot systems through improved addressing of corner cases and extreme circumstances, which require specialized training and cannot be addressed by generic labeled training datasets. Non-limiting examples of corner cases include simultaneous or overlapping plane failures (e.g., engine failure, wing failure) and situations not addressed in existing flight manuals (e.g., insufficient seating capacity in emergency situations). Non-limiting examples of extreme circumstances include an incapacitated crew and dual engine failure. In these types of cases, the AI can learn directly from the human pilot and accumulate specialized skills based on a given operating situation. As can be appreciated by one skilled in the art, principles of this invention also apply to the operation of semi-autonomous vehicles, while also acting as a stepping stone toward full autonomy by improving the training of AI systems through bidirectional teaching. An intuitive interface between humans and machines increases product usability without losing the advantages of human experience. Thus, as noted above, this disclosure was drafted using pilots as a non-limiting example of a suitable application in which the present system can be implemented. However, the system can be implemented in any system in which a human operator interacts with a machine that performs operations, including autonomous vehicles (e.g., plane, car, truck, drone, etc.), assembly line robots, etc.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for human-machine teaching for vehicle operation, the system comprising:
   one or more processors and a non-transitory computer-readable medium having executable instructions encoded thereon such that when executed, the one or more processors perform operations of:
   determining one or more currently enabled status reporting modes on a vehicle interface of a vehicle;

comparing the one or more currently enabled status reporting modes to a set of status reporting modes of previous users;
based on the comparison, selecting a status reporting mode;
reporting to a current user, via the vehicle interface, a current operational status of the vehicle using the selected status reporting mode;
determining a set of solutions of previous users to address the current operational status of the vehicle;
reporting to the current user, via the vehicle interface, one or more suggestions to address the current operational status of the vehicle based on the set of solutions; and
implementing a vehicle action via a vehicle component, wherein the vehicle action corresponds to a solution selected by the current user based on the one or more suggestions.

2. The system as set forth in claim 1, wherein comparing the one or more currently enabled reporting modes to a set of status reporting modes of previous users comprises:
applying a similarity metric to identify a set of previous users that are most similar to the current user;
determining an averaged preference value for each of the status reporting modes of the set of previous users;
wherein reporting, to the current user, the current operational status of vehicle comprises:
activating a status reporting mode in the vehicle having an averaged preference value above a predetermined threshold; and
using the activated status reporting mode, reporting the current operational status of the vehicle via the vehicle interface.

3. The system as set forth in claim 2, wherein the similarity metric is a k nearest neighbor (KNN) technique.

4. The system as set forth in claim 2, wherein the similarity metric is Latent Dirichlet Allocation (LDA).

5. The system as set forth in claim 1, wherein determining the set of solutions of previous users comprises:
generating a set of expert-weighted solutions by applying a similarity metric to a plurality of expert-weighted solutions;
averaging the set of expert-weighted solutions; and
ranking the set of expert-weighted solutions, and
wherein reporting the one or more suggestions to the current user comprises:
presenting the ranked set of expert-weighted solutions to the current user via the vehicle interface.

6. The system as set forth in claim 1, wherein the one or more processors further perform operations of:
updating the one or more currently enabled status reporting modes based on manual feedback, via the vehicle interface, from the current user; and
updating the one or more suggestions based on the updated one or more currently enabled status reporting modes.

7. A computer program product for human-machine teaching for vehicle operation, the computer program product comprising:
a non-transitory computer-readable medium having executable instructions encoded thereon, such that upon execution of the instructions by one or more processors, the one or more processors perform operations of:
determining one or more currently enabled status reporting modes on a vehicle interface of a vehicle;
comparing the one or more currently enabled status reporting modes to a set of status reporting modes of previous users;
based on the comparison, selecting a status reporting mode;
reporting to a current user, via the vehicle interface, a current operational status of the vehicle using the selected status reporting mode;
determining a set of solutions of previous users to address the current operational status of the vehicle;
reporting to the current user, via the vehicle interface, one or more suggestions to address the current operational status of the vehicle based on the set of solutions; and
implementing a vehicle action via a vehicle component, wherein the vehicle action corresponds to a solution selected by the current user based on the one or more suggestions.

8. The computer program product as set forth in claim 7, wherein comparing the one or more currently enabled reporting modes to a set of status reporting modes of previous users comprises:
applying a similarity metric to identify a set of previous users that are most similar to the current user;
determining an averaged preference value for each of the status reporting modes of the set of previous users;
wherein reporting, to the current user, the current operational status of vehicle comprises:
activating a status reporting mode in the vehicle having an averaged preference value above a predetermined threshold; an
using the activated status reporting mode, reporting the current operational status of the vehicle via the vehicle interface.

9. The computer program product as set forth in claim 8, wherein the similarity metric is a k nearest neighbor (KNN) technique.

10. The computer program product as set forth in claim 8, wherein the similarity metric is Latent Dirichlet Allocation (LDA).

11. The computer program product as set forth in claim 7, wherein determining the set of solutions of previous users comprises:
generating a set of expert-weighted solutions by applying a similarity metric to a plurality of expert-weighted solutions;
averaging the set of expert-weighted solutions; and
ranking the set of expert-weighted solutions, and
wherein reporting the one or more suggestions to the current user comprises:
presenting the ranked set of expert-weighted solutions to the current user via the vehicle interface.

12. The computer program product as set forth in claim 7, further comprising instructions for causing the one or more processors to further perform operations of:
updating the one or more currently enabled status reporting modes based on manual feedback, via the vehicle interface, from the current user; and
updating the one or more suggestions based on the updated one or more currently enabled status reporting modes.

13. A computer implemented method for human-machine teaching for vehicle operation, the method comprising an act of:
causing one or more processors to execute instructions encoded on a non-transitory computer-readable medium, such that upon execution, the one or more processors perform operations of:
- determining one or more currently enabled status reporting modes on a vehicle interface of a vehicle;
- comparing the one or more currently enabled status reporting modes to a set of status reporting modes of previous users;
- based on the comparison, selecting a status reporting mode;
- reporting to a current user, via the vehicle interface, a current operational status of the vehicle using the selected status reporting mode;
- determining a set of solutions of previous users to address the current operational status of the vehicle;
- reporting to the current user, via the vehicle interface, one or more suggestions to address the current operational status of the vehicle based on the set of solutions; and
- implementing a vehicle action via a vehicle component, wherein the vehicle action corresponds to a solution selected by the current user based on the one or more suggestions.

14. The method as set forth in claim 13, wherein comparing the one or more currently enabled reporting modes to a set of status reporting modes of previous users comprises:
- applying a similarity metric to identify a set of previous users that are most similar to the current user;
- determining an averaged preference value for each of the status reporting modes of the set of previous users;
- wherein reporting, to the current user, the current operational status of vehicle comprises:
  - activating a status reporting mode in the vehicle having an averaged preference value above a predetermined threshold; and
- using the activated status reporting mode, reporting the current operational status of the vehicle via the vehicle interface.

15. The method as set forth in claim 14, wherein the similarity metric is a k nearest neighbor (KNN) technique.

16. The method as set forth in claim 14, wherein the similarity metric is Latent Dirichlet Allocation (LDA).

17. The method as set forth in claim 13, wherein determining the set of solutions of previous users comprises:
- generating a set of expert-weighted solutions by applying a similarity metric to a plurality of expert-weighted solutions;
- averaging the set of expert-weighted solutions; and
- ranking the set of expert-weighted solutions, and
- wherein reporting the one or more suggestions to the current user comprises:
  - presenting the ranked set of expert-weighted solutions to the current user via the vehicle interface.

18. The method as set forth in claim 13, wherein the one or more processors further perform operations of:
- updating the one or more currently enabled status reporting modes based on manual feedback, via the vehicle interface, from the current user; and
- updating the one or more suggestions based on the updated one or more currently enabled status reporting modes.

* * * * *